(12) United States Patent
Johnson et al.

(10) Patent No.: US 6,386,804 B1
(45) Date of Patent: May 14, 2002

(54) RECESSED DAMAGED STUD RE-THREADING TOOL

(76) Inventors: Aubrey Joe Johnson, 4035 Pacific Ave.; Bill Nelson, 3541 Lewis Ave., both of Long Beach, CA (US) 90807

(*) Notice: Subject to any disclaimer, the term of this patent is extended or adjusted under 35 U.S.C. 154(b) by 0 days.

(21) Appl. No.: 09/756,000

(22) Filed: Jan. 8, 2001

(51) Int. Cl.$^7$ ................................................ B23G 5/04
(52) U.S. Cl. .................... 408/221; 408/239 R; 470/207
(58) Field of Search .................. 408/121, 122, 408/123, 120, 221, 238, 239 R; 470/207

(56) References Cited

U.S. PATENT DOCUMENTS

| | | | | |
|---|---|---|---|---|
| 1,328,279 A | * | 1/1920 | Grauer | 408/200 |
| 2,028,437 A | * | 1/1936 | Carliss | 408/199 |
| 3,715,168 A | * | 2/1973 | Kuhn | 408/221 |
| 4,095,917 A | * | 6/1978 | Wesner | 408/239 R |
| 4,097,182 A | * | 6/1978 | Rolnick | 408/239 R |
| 4,466,762 A | * | 8/1984 | Menke | 408/222 |
| 4,856,946 A | * | 8/1989 | Park | 408/123 |
| 5,343,787 A | * | 9/1994 | McDonnell | 408/221 |
| 5,490,746 A | * | 2/1996 | Baker | 408/221 |

* cited by examiner

Primary Examiner—Daniel W. Howell
(74) Attorney, Agent, or Firm—Goldstein Law Offices P.C.

(57) ABSTRACT

A recessed damaged stud re-threading tool including a cylindrical housing having an open lower end, a closed upper end, and a cylindrical side wall therebetween. The open lower end exposes an internal chamber. The cylindrical side wall has a channel extending therethrough downwardly of the closed upper end. A cylindrical thread die is positionable within the internal chamber of the cylindrical housing. The thread die has an open lower end for receiving a stud therein. A first handle is positionable within the channel extending through the cylindrical side wall of the cylindrical housing. The first handle is linear. The first handle has opposed ends exposed in a diametrically opposed relationship with respect to the cylindrical housing.

5 Claims, 3 Drawing Sheets

RECESSED DAMAGED STUD RE-THREADING TOOL

BACKGROUND OF THE INVENTION

The present invention relates to a recessed damaged stud re-threading tool and more particularly pertains to allowing threads on a recessed stud to be restored.

The use of tools is known in the prior art. More specifically, tools heretofore devised and utilized for the purpose of performing various functions are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,203,652 to Woods discloses a tap and die wrench for threading round workpieces. U.S. Pat. No. 4,096,776 to Laucke discloses a retainer device for securing machine tools, such as punches and dies. U.S. Pat. No. 4,501,519 to Leon discloses a tool for cutting the initial threads on a pipe or bolt.

While these devices fulfill their respective, particular objective and requirements, the aforementioned patents do not describe a recessed damaged stud re-threading tool for allowing threads on a recessed stud to be restored.

In this respect, the recessed damaged stud re-threading tool according to the present invention substantially departs from the conventional concepts and designs of the prior art, and in doing so provides an apparatus primarily developed for the purpose of allowing threads on a recessed stud to be restored.

Therefore, it can be appreciated that there exists a continuing need for a new and improved recessed damaged stud re-threading tool which can be used for allowing threads on a recessed stud to be restored. In this regard, the present invention substantially fulfills this need.

SUMMARY OF THE INVENTION

In the view of the foregoing disadvantages inherent in the known types of tools now present in the prior art, the present invention provides an improved recessed damaged stud re-threading tool. As such, the general purpose of the present invention, which will be described subsequently in greater detail, is to provide a new and improved recessed damaged stud re-threading tool which has all the advantages of the prior art and none of the disadvantages.

To attain this, the present invention essentially comprises a cylindrical housing having an open lower end, a closed upper end, and a cylindrical side wall therebetween. The open lower end exposes an internal chamber. The closed upper end has a central square-shaped aperture and a pair of diametrically opposed round apertures therein. The cylindrical side wall has a channel extending therethrough downwardly of the closed upper end. The cylindrical side wall has an opening therein upwardly of the open lower end and is in communication with the internal chamber. A cylindrical thread die is positionable within the internal chamber of the cylindrical housing. The thread die is held within the internal chamber by a set screw insertable within the opening in the cylindrical side wall. The thread die has an open lower end for receiving a stud therein. A first handle is positionable within the channel extending through the cylindrical side wall of the cylindrical housing. The first handle is linear. The first handle has opposed ends exposed in a diametrically opposed relationship with respect to the cylindrical housing. A second handle is adapted for coupling with one of the pair of round apertures of the cylindrical housing. The second handle is essentially L-shaped defined by a long horizontal portion and a short vertical portion. The short vertical portion has a free end receivable within one of the pair of round apertures.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions. insofar as they do not depart from the spirit and scope of the present invention.

It is therefore an object of the present invention to provide a new and improved recessed damaged stud re-threading tool which has all the advantages of the prior art tools and none of the disadvantages.

It is another object of the present invention to provide a new and improved recessed damaged stud re-threading tool which may be easily and efficiently manufactured and marketed.

It is a further object of the present invention to provide a new and improved recessed damaged stud re-threading tool which is of durable and reliable construction.

An even further object of the present invention is to provide a new and improved recessed damaged stud re-threading tool which is susceptible of a low cost of manufacture with regard to both materials and labor, and which accordingly is then susceptible of low prices of sale to the consuming public, thereby making such a recessed damaged stud re-threading tool economically available to the buying public.

Even still another object of the present invention is to provide a new and improved recessed damaged stud re-threading tool for allowing threads on a recessed stud to be restored.

Lastly, it is an object of the present invention to provide a new and improved recessed damaged stud re-threading tool including a cylindrical housing having an open lower end, a closed upper end, and a cylindrical side wall therebetween. The open lower end exposes an internal chamber. The cylindrical side wall has a channel extending therethrough downwardly of the closed upper end. A cylindrical thread die is positionable within the internal chamber of the cylindrical housing. The thread die has an open lower end for receiving a stud therein. A first handle is positionable within the channel extending through the cylindrical side wall of the cylindrical housing. The first handle is linear. The first handle has opposed ends exposed in a diametrically opposed relationship with respect to the cylindrical housing.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
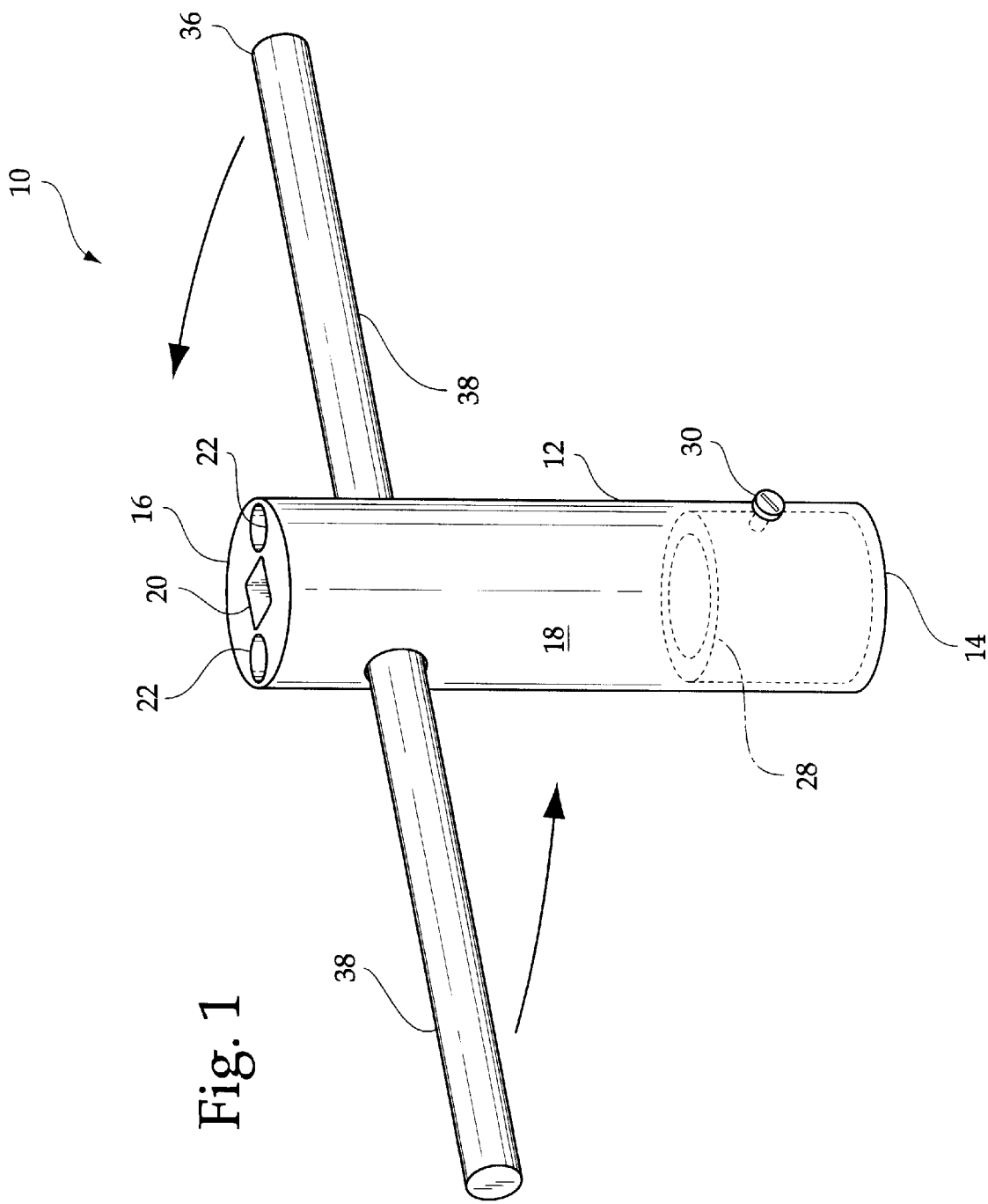
FIG. 1 is a perspective view of the preferred embodiment of the recessed damaged stud re-threading tool constructed in accordance with the principles of the present invention.
Figure 2:
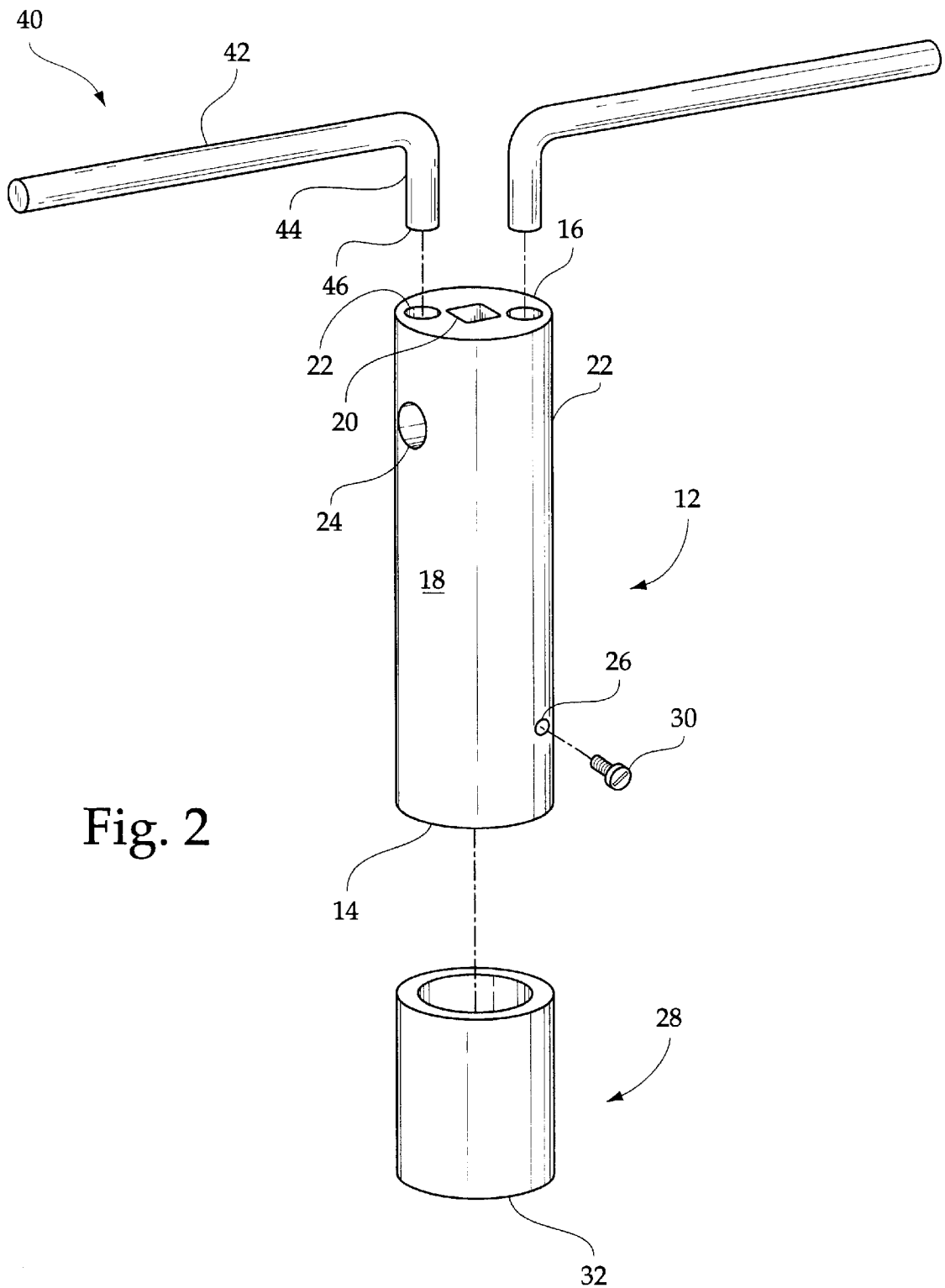
FIG. 2 is an exploded perspective view of the present invention.
Figure 3:
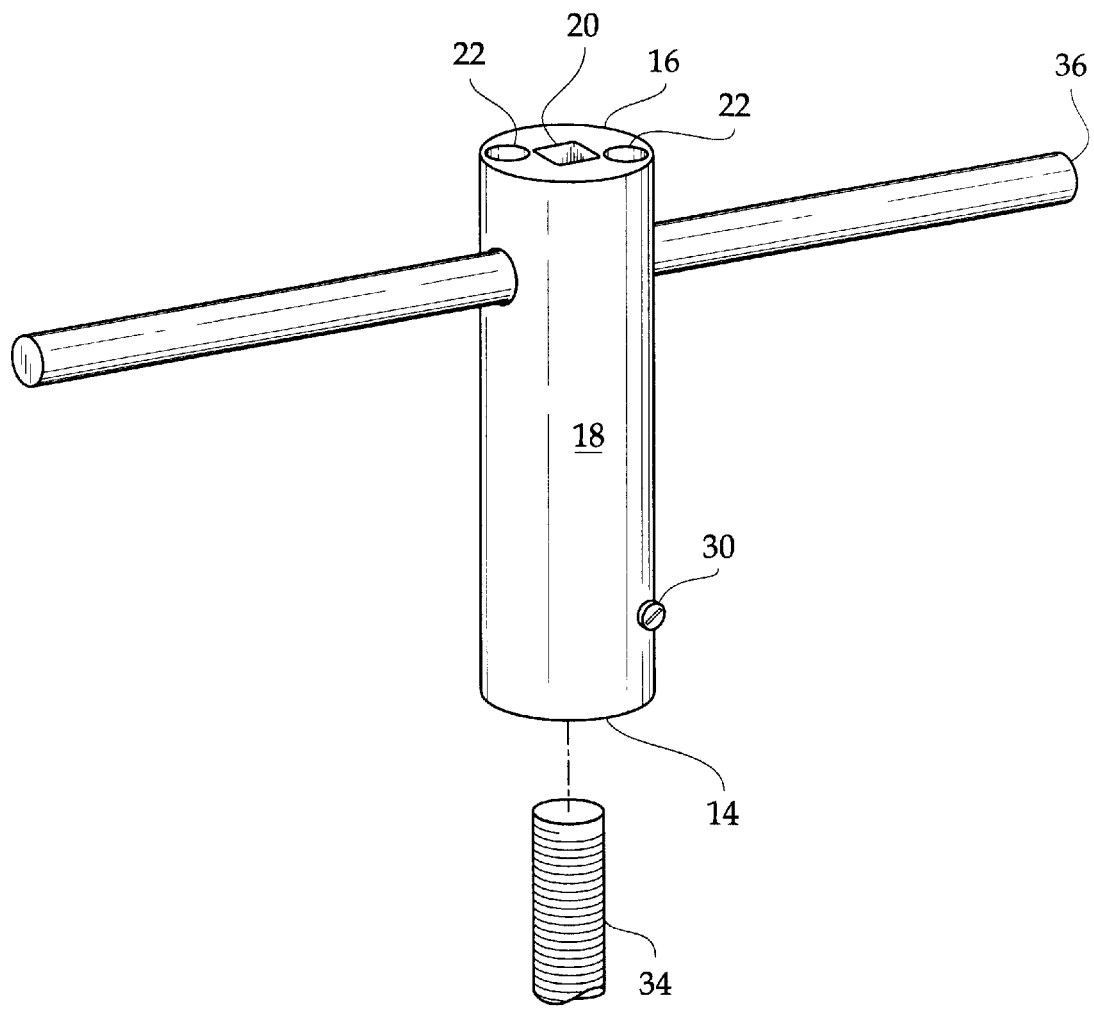
FIG. 3 is a perspective view of the present invention illustrated in use.

With reference now to the drawings, and in particular, to FIGS. 1 through 3 thereof, the preferred embodiment of the new and improved recessed damaged stud re-threading tool embodying the principles and concepts of the present invention and generally designated by the reference number 10 will be described.

Specifically, it will be noted in the various figures that the device relates to a recessed damaged stud re-threading tool for allowing threads on a recessed stud to be restored. In its broadest context, the device consists of a cylindrical housing, a cylindrical thread die, a first handle, and a second handle. Such components are individually configured and correlated with respect to each other so as to attain the desired objective.

The cylindrical housing 12 has an open lower end 14, a closed upper end 16, and a cylindrical side wall 18 therebetween. The open lower end 14 exposes an internal chamber. The closed upper end 16 has a central square-shaped aperture 20 and a pair of diametrically opposed round apertures 22 therein. The cylindrical side wall 18 has a channel 24 extending therethrough downwardly of the closed upper end 16. The cylindrical side wall 18 has an opening 26 therein upwardly of the open lower end 14 and is in communication with the internal chamber.

The cylindrical thread die 28 is positionable within the internal chamber of the cylindrical housing 12. The thread die 28 is held within the internal chamber by a set screw 30 that is inserted within the opening 26 in the cylindrical side wall 18. The thread die 28 has an open lower end 32 for receiving a stud 34 therein.

The first handle 36 is positionable within the channel 24 extending through the cylindrical side wall 18 of the cylindrical housing 12. The first handle 36 is linear. The first handle 36 has opposed ends 38 exposed in a diametrically opposed relationship with respect to the cylindrical housing 12. Note FIGS. 1 and 3.

The second handle 40 is adapted for coupling with one of the pair of round apertures 22 of the cylindrical housing 12. The second handle 40 is essentially L-shaped defined by a long horizontal portion 42 and a short vertical portion 44. The short vertical portion 44 has a free end 46 receivable within one of the pair of round apertures 22. Note FIG. 2.

In use, the cylindrical thread die 28 is positioned within the internal chamber of the cylindrical housing 12 and is held in place by the set screw 30. The open lower end 14 of the cylindrical housing 12 is then positioned over the recessed stud 34 whereby the stud 34 is received within the open lower end 32 of the thread die 28. The user then will attach either the first handle 36 or the second handle 40 to the cylindrical housing 12 depending on the situation. The user will then grasp the first or second handle in a manner to rotate the thread die 28 around the stud 32 in order to effectively re-thread the stud for additional use.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A recessed damaged stud re-threading tool for allowing threads on a recessed stud to be restored comprising, in combination:

a cylindrical housing having an open lower end, a closed upper end, and a cylindrical side wall therebetween, the open lower end exposing an internal chamber, the closed upper end having a central square-shaped aperture and a pair of diametrically opposed round apertures therein, the cylindrical side wall having a channel extending therethrough downwardly of the closed upper end, the cylindrical side wall having an opening therein upwardly of the open lower end being in communication with the internal chamber;

a cylindrical thread die positionable within the internal chamber of the cylindrical housing, the thread die being held within the internal chamber by a set screw insertable within the opening in the cylindrical side wall, the thread die having an open lower end for receiving a stud therein;

a first handle positionable within the channel extending through the cylindrical side wall of the cylindrical housing, the first handle being linear, the first handle having opposed ends exposed in a diametrically opposed relationship with respect to the cylindrical housing; and a second handle adapted for coupling with one of the pair of round apertures of the cylindrical housing, the second handle being essentially L-shaped defined by a long horizontal portion and a short vertical portion, the short vertical portion having a free end receivable within one of the pair of round apertures.

2. A recessed damaged stud re-threading tool for allowing threads on a recessed stud to be restored comprising, in combination:
- a cylindrical housing having an open lower end, a closed upper end, and a cylindrical side wall therebetween, the open lower end exposing an internal chamber, the cylindrical side wall having a channel extending therethrough downwardly of the closed upper end;
- a cylindrical thread die positionable within the internal chamber of the cylindrical housing, the thread die having an open lower end for receiving a stud therein; and
- a first handle positionable within the channel extending through the cylindrical side wall of the cylindrical housing, the first handle being linear, the first handle having opposed ends exposed in a diametrically opposed relationship with respect to the cylindrical housing.

3. The recessed damaged stud re-threading tool as set forth in claim 2 wherein the cylindrical side wall of the cylindrical housing has an opening therein upwardly of the open lower end in communication with the internal chamber for receiving a set screw to secure the thread die within the internal chamber.

4. The recessed damaged stud re-threading tool as set forth in claim 2, and further including a second handle adapted for coupling with one of a pair of round apertures formed within the closed upper end of the cylindrical housing.

5. The recessed damaged stud re-threading tool as set forth in claim 4, wherein the second handle is essentially L-shaped defined by a long horizontal portion and a short vertical portion, the short vertical portion having a free end receivable within one of the pair of round apertures.

* * * * *